US012641137B2

(12) United States Patent
Sodagar

(10) Patent No.: US 12,641,137 B2
(45) Date of Patent: May 26, 2026

(54) PROCEDURES FOR PROVIDING AR/MR APPLICATIONS TO 5G DEVICES BY RUNNING AR/MR PROCESSING ON 5G EDGE SERVERS/CLOUD INCLUDING DYNAMIC SCENE UPDATES

(71) Applicant: TENCENT AMERICA LLC, Palo Alto, CA (US)

(72) Inventor: Iraj Sodagar, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 21 days.

(21) Appl. No.: 17/726,067

(22) Filed: Apr. 21, 2022

(65) Prior Publication Data

US 2023/0050360 A1     Feb. 16, 2023

Related U.S. Application Data

(60) Provisional application No. 63/232,540, filed on Aug. 12, 2021, provisional application No. 63/232,544, filed on Aug. 12, 2021.

(51) Int. Cl.
H04L 65/75 (2022.01)
G06T 11/00 (2026.01)

(52) U.S. Cl.
CPC .............. H04L 65/75 (2022.05); G06T 11/00 (2013.01); G06T 2200/16 (2013.01); G06T 2210/61 (2013.01)

(58) Field of Classification Search
CPC ....... H04L 65/75; H04L 65/612; H04L 67/51; G06T 11/00; G06T 2200/16;
(Continued)

(56) References Cited

U.S. PATENT DOCUMENTS

2017/0372138 A1   12/2017   Subbian et al.
2018/0070113 A1   3/2018   Phillips et al.
(Continued)

FOREIGN PATENT DOCUMENTS

WO      WO 2022/241119 A1 *  11/2022   ............. H04N 21/63

OTHER PUBLICATIONS

"3rd Generation Partnership Project; Technical Specification Group Services and System Aspects; 5G Media Streaming (5GMS); General description and architecture (Release 16)", 3GPP TS 26.501v16.8.0 (Jun. 2021), 79 pages.
(Continued)

*Primary Examiner* — Devona E Faulk
*Assistant Examiner* — Donna J. Ricks
(74) *Attorney, Agent, or Firm* — Sughrue Mion, PLLC

(57)     ABSTRACT
A method is provided. The method includes selecting, with an augmented reality (AR)/mixed reality (MR) application, media content for playback, discovering, with the AR/MR application, at least one $5^{th}$ Generation media streaming downlink (5GMSd) application server (AS) with edge capabilities suitable for playback of the selected media content, selecting, with the AR/MR application, the at least one 5GMSd AS for playback of the selected media content, and requesting, with the AR/MR application, playback of the selected media content by the selected at least one 5GMSd AS.

17 Claims, 14 Drawing Sheets

300

(58) Field of Classification Search
CPC ............ G06T 2210/61; H04N 21/2393; H04N 21/2223; H04N 21/23412; H04N 21/26291; H04N 21/47202; H04N 21/6131; H04N 21/816; H04N 21/8173
See application file for complete search history.

(56) References Cited

U.S. PATENT DOCUMENTS

| | | |
|---|---|---|
| 2019/0385376 A1 | 12/2019 | Kim et al. |
| 2019/0391855 A1 | 12/2019 | Bernat et al. |
| 2020/0084488 A1 | 3/2020 | Christie et al. |
| 2020/0326831 A1 | 10/2020 | Marr |
| 2022/0337919 A1* | 10/2022 | Yip ...................... H04N 21/816 |

OTHER PUBLICATIONS

International Search Report dated Aug. 2, 2022 in International Application No. PCT/US22/27428.

Written Opinion of the International Searching Authority dated Aug. 2, 2022 in International Application No. PCT/US22/27428.
"3rd Generation Partnership Project; Technical Specification Group Services and System Aspects; Study on 5G Media Streaming Extensions for Edge Processing (Release 17)," 3GPP TR 26.803v1. 2.0, Apr. 2021, XP51996465A, pp. 1-51 (51 pages total).
"3rd Generation Partnership Project; Technical Specification Group SA WG4; Support of 5G Glass-type Augmented Reality/Mixed Reality (AR/MR) devices (Release 17)," 3GPP TR 26.998v0.9.0, Aug. 2021, XP52031765A, pp. 1-65 (65 pages total).
"[FS_5GSTAR] EDGAR-based media streaming update," Tencent, 3GPP SA4#115-e, Psuedo Change Request, 26.998 CR v0.9.0, Aug. 18-27, 2021, S4-211122, XP 52064348A, pp. 1-10 (10 pages total).
Extended European Search Report issued Dec. 15, 2023 in Application No. 22856362.3.
3rd Generation Partnership Project; Technical Specification Group SA, WG4, "Support of 5G Glass-type Augmented Reality / Mixed Reality (AR/MR) devices; (Release 17)", 3GPP TR 26.998 V0.9.0, Aug. 2021 (9 pages total).
Communication issued Jan. 4, 2026 in Chinese Application No. APP No. 202280006647.8.

* cited by examiner

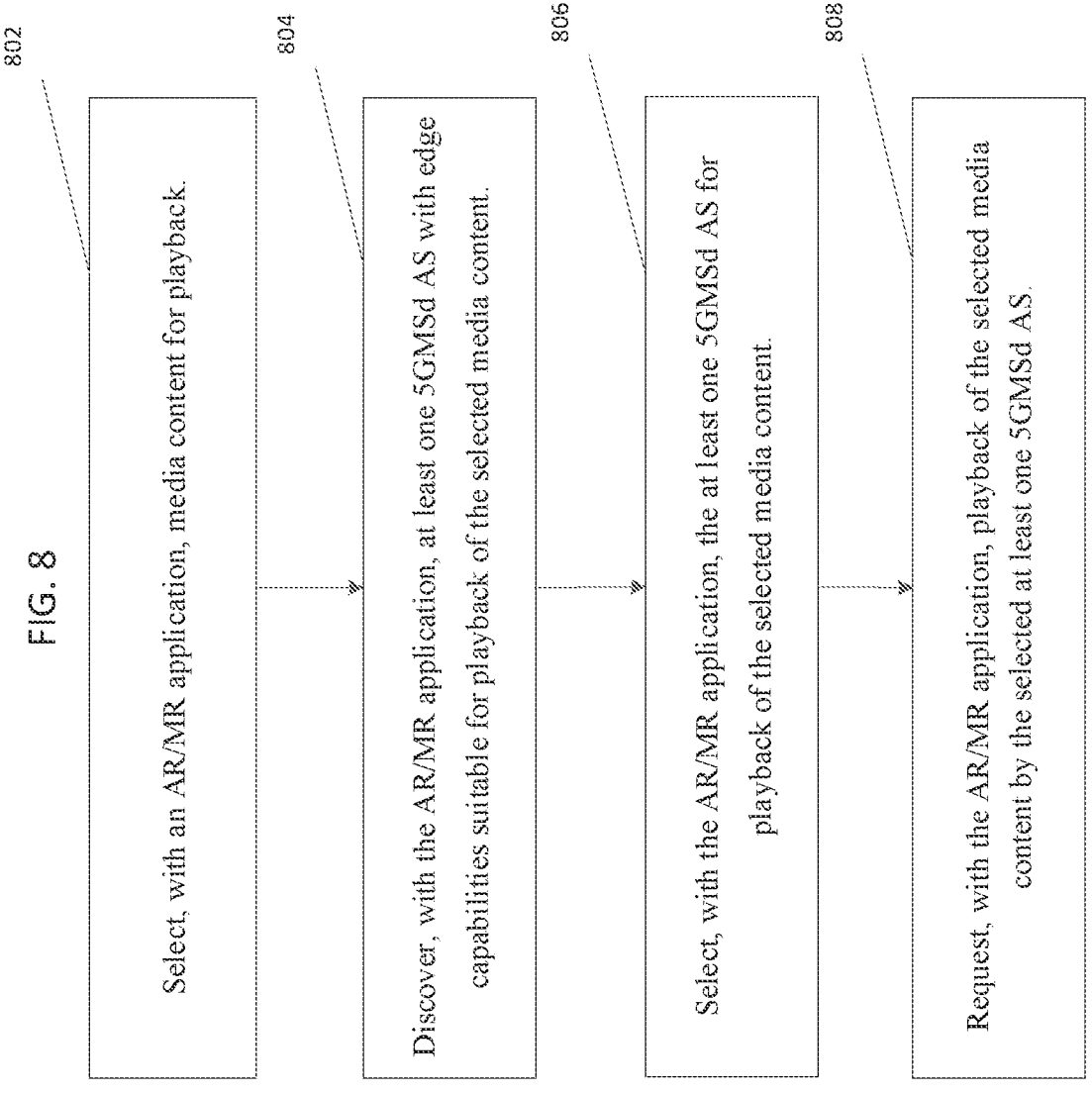

FIG. 8

802 Select, with an AR/MR application, media content for playback.

804 Discover, with the AR/MR application, at least one 5GMSd AS with edge capabilities suitable for playback of the selected media content.

806 Select, with the AR/MR application, the at least one 5GMSd AS for playback of the selected media content.

808 Request, with the AR/MR application, playback of the selected media content by the selected at least one 5GMSd AS.

800

PROCEDURES FOR PROVIDING AR/MR APPLICATIONS TO 5G DEVICES BY RUNNING AR/MR PROCESSING ON 5G EDGE SERVERS/CLOUD INCLUDING DYNAMIC SCENE UPDATES

CROSS-REFERENCE TO RELATED APPLICATION

This application claims priority to U.S. Provisional Application No. 63/232,540, filed on Aug. 12, 2021 in the United States Patent and Trademark Office, and U.S. Provisional Application No. 63/232,544, filed on Aug. 12, 2021, in the United States Patent and Trademark Office, the disclosures of which are incorporated herein by reference in their entireties.

FIELD

The disclosure generally relates to $5^{th}$ generation (5G) augmented reality (AR)/mixed reality (MR), and, in particular, to a method and apparatus for providing AR/MR applications to 5G devices.

BACKGROUND

The 3rd Generation Partnership Project (3GPP) TS26.501 defines the media streaming architecture for $5^{th}$ generation (5G) networks. The 3GPP started a technical report on supporting augmented reality (AR)/mixed reality (MR) applications. 3GPP TR 26.998 defines the support for glass-type AR/MR devices in 5G networks. Two device classes are considered: devices that are fully capable of decoding and playing complex AR/MR content (i.e., stand-alone AR (STAR)), and devices that have smaller computational resources and/or smaller physical size (i.e., a smaller battery), and are only capable of running such applications if the larger portion of the computation is performed on 5G edge servers, networks, or clouds rather than on the device (edge dependent AR (EDGAR).

The selection of edge servers may be performed by a media session handler. However, the selection may occur prior to the AR/MR application deciding on the subset of media components of an immersive scene to be streamed. Thus, the required computational resources may be affected by the AR/MR application choices, which is not currently considered. Furthermore, the AR/MR application and media session handler should operate jointly or by the AR/MR application provider through a $5^{th}$ Generation media streaming downlink (5GMSd) application function (AF), which is not currently considered. Additionally, it is not clear how the AR/MR application selects the media components of the scene to be streamed to the device without receiving the full scene graph. Lastly, the scene updates are not addressed in the current workflow.

SUMMARY

In accordance with an aspect of the disclosure, a method may include selecting, with an augmented reality (AR)/mixed reality (MR) application, media content for playback, discovering, with the AR/MR application, at least one $5^{th}$ Generation media streaming downlink (5GMSd) application server (AS) with edge capabilities suitable for playback of the selected media content, selecting, with the AR/MR application, the at least one 5GMSd AS for playback of the selected media content, and requesting, with the AR/MR application, playback of the selected media content by the selected at least one 5GMSd AS.

In accordance with an aspect of the disclosure, a device may include at least one memory configured to store program code, and at least one processor configured to read the program code and operate as instructed by the program code, the program code including first selecting code configured to cause the at least one processor to select, with an AR/MR application, media content for playback, first discovering code configured to cause the at least one processor to discover, with the AR/MR application, at least one 5GMSd AS with edge capabilities suitable for playback of the selected media content, second selecting code configured to cause the at least one processor to select, with the AR/MR application, the at least one 5GMSd AS for playback of the selected media content, first requesting code configured to cause the at least one processor to request, with the AR/MR application, playback of the selected media content by the selected at least one 5GMSd AS.

In accordance with an aspect of the disclosure, a non-transitory computer-readable medium may store instructions, the instructions including: one or more instructions that, when executed by one or more processors of a device, cause the one or more processors to select, with an AR/MR application, media content for playback, discover, with the AR/MR application, at least one 5GMSd AS with edge capabilities suitable for playback of the selected media content, select, with the AR/MR application, the at least one 5GMSd AS for playback of the selected media content, and request, with the AR/MR application, playback of the selected media content by the selected at least one 5GMSd AS.

BRIEF DESCRIPTION OF THE DRAWINGS

Further features, the nature, and various advantages of the disclosed subject matter will be more apparent from the following detailed description and the accompanying drawings in which:

FIG. 3 is a diagram of a media architecture for media uplink streaming, according to embodiments.

FIG. 8 is a flowchart of a process for EDGAR-based 5G downlink streaming, according to embodiments.

DETAILED DESCRIPTION

Figure 1:
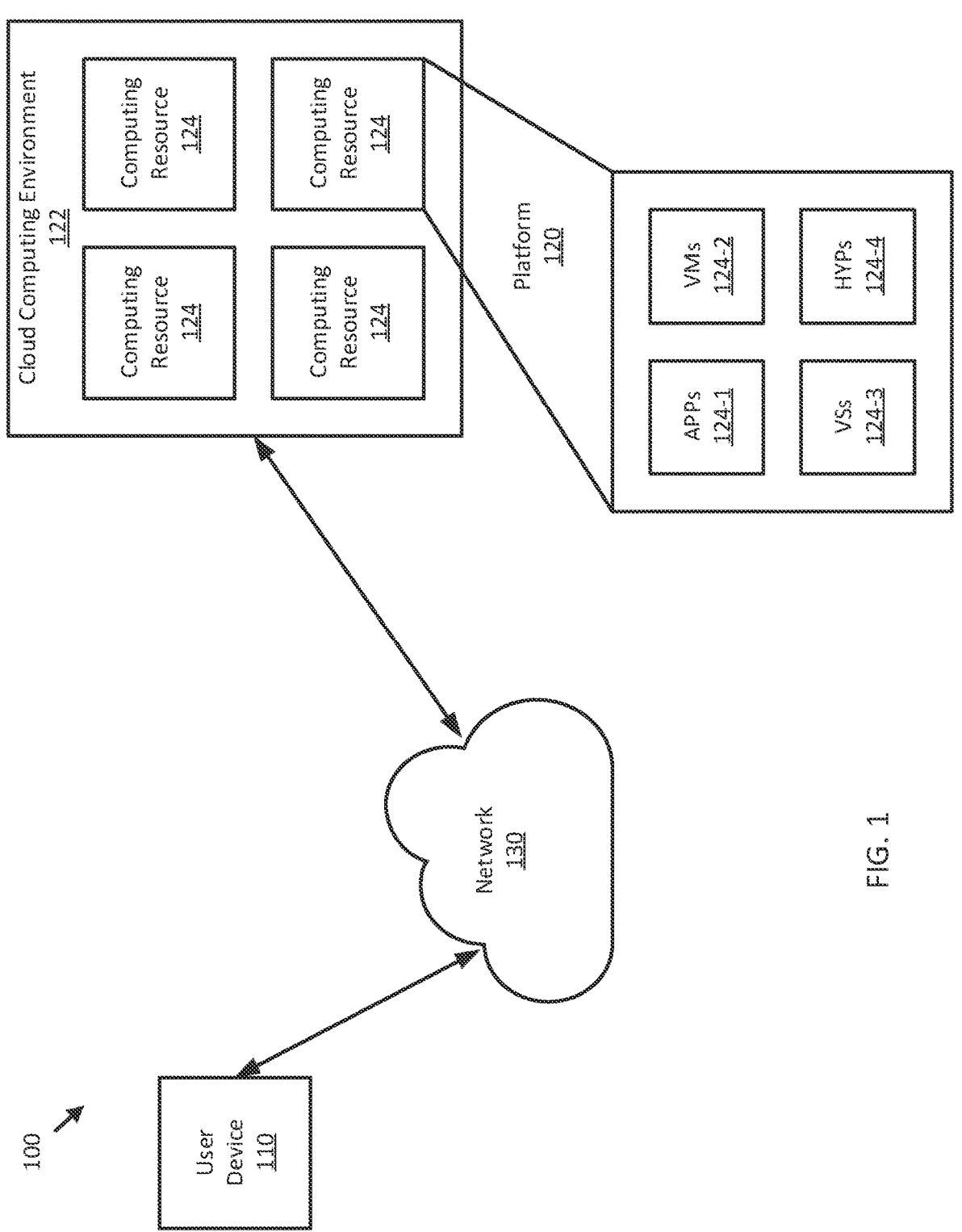
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSs) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment

100 may perform one or more functions described as being performed by another set of devices of the environment 100.

Figure 2:
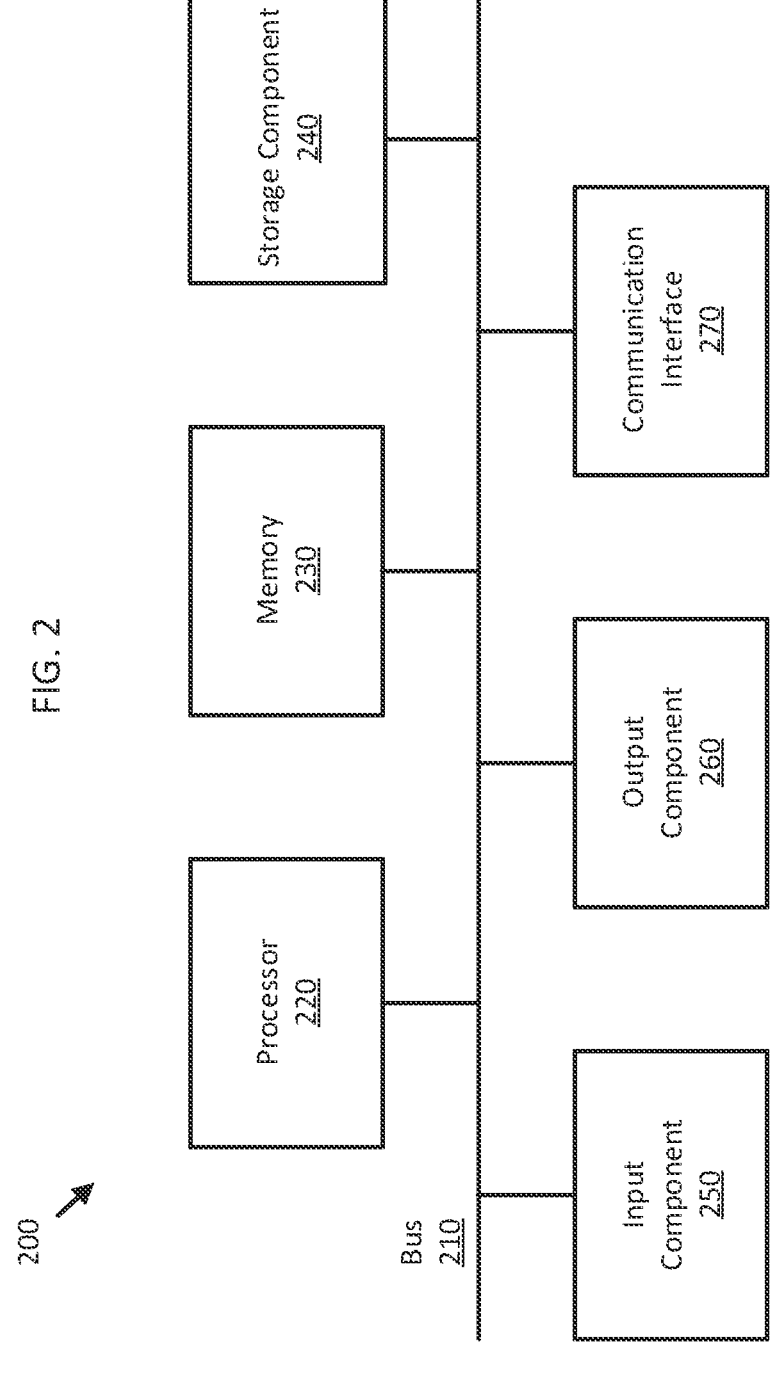
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

A 5G media streaming (5GMS) system may be an assembly of application functions, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (M1d) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, and stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

Figure 3:
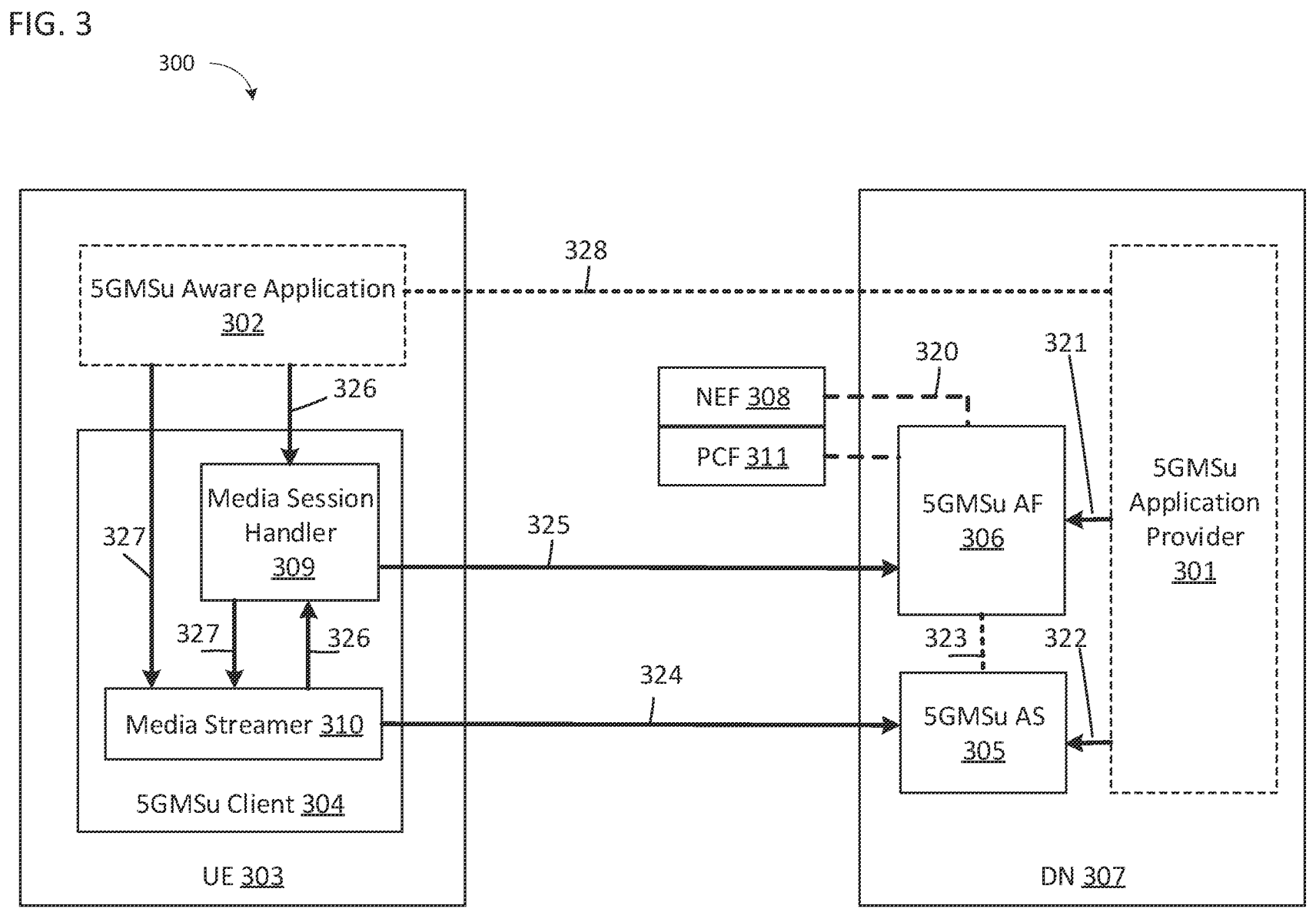

FIG. 3 is a diagram of a media architecture 300 for media uplink streaming according to embodiments. A 5GMSu Application Provider 301 may use 5GMSu for uplink streaming services. 5GMSu Application provider 301 may provide a 5GMSu Aware Application 302 on the UE 303 to make use of 5GMSu Client 304 and network functions using interfaces and APIs defined in 5GMSu. 5GMSu AS may be an AS dedicated to 5G Media Uplink Streaming. 5GMSu Client 304 may be a UE 303 internal function dedicated to 5G Media Uplink Streaming.

5GMSu AF 306 and 5GMSu AS 305 may be Data Network (DN) 307 functions. Functions in trusted DNs may be trusted by the operator's network. Therefore, AFs in trusted DNs may directly communicate with all 5G Core functions. Functions in external DNs may only communicate with 5G Core functions via the NEF 308 using link 320.

The media architecture 300 may connect UE 303 internal functions and related network functions for 5G Media Uplink Streaming. Accordingly, media architecture 300 may include a number of functions. For example, 5GMSu Client 304 on UE 303 may be an originator of 5GMSu service that may be accessed through interfaces/APIs. 5GMSu Client 304 may include two sub-functions, media session handler 309 and media streamer 310. Media session handler 309 may communicate with the 5GMSu AF 306 in order to establish, control and support the delivery of a media session. The Media Session Handler 309 may expose APIs that can be used by the 5GMSu Aware Application 302. Media Streamer 310 may communicate with 5GMSu AS 305 in order to stream the media content and provide a service to the 5GMSu Aware Application 302 for media capturing and streaming, and the Media Session Handler 309 for media session control. 5GMSu Aware Application 302 may control 5GMSu Client 304 by implementing external application or content service provider specific logic and enabling the establishment of a media session. 5GMSu AS 305 may host 5G media functions and may be implemented as a content delivery network (CDN), for example. 5GMSu Application Provider 301 may be an external application or content specific media functionality, e.g., media storage, consumption, transcoding and redistribution that uses 5GMSu to stream media from 5GMSu Aware Application 302. 5GMSu AF 306 may provide various control functions to the Media Session Handler 309 on the UE 303 and/or to 5GMSu Application Provider 301. 5GMSu AF 306 may relay or initiate a request for different PCF 311 treatment or interact with other network functions.

Media architecture 300 may include a number of different interfaces. For example, link 321 may relate to M1u, which may be a 5GMSu Provisioning API exposed by 5GMSu AF 306 to provision usage of media architecture 300 and to obtain feedback. Link 322 may relate to M2u, which may be a 5GMSu Publish API exposed by 5GMSu AS 305 and used when 5GMSu AS 305 in trusted DN, such as DN 307, is selected to receive content for streaming service. Link 323 may relate to M3u, which may be an internal API used to exchange information for content hosting on 5GMSu AS 305 within a trusted DN such as DN 307. Link 324 may relate to M4u, which may be a Media Uplink Streaming API exposed by 5GMSu AS 323 to Media Streamer 310 to stream media content. Link 325 may relate to M5u, which may be a Media Session Handling API exposed by 5GMSu AF 305 to Media Session Handler for media session handling, control and assistance that also include appropriate security mechanisms e.g. authorization and authentication. Link 326 may relate to M6u, which may be a UE 303 Media Session Handling API exposed by Media Session Handler 309 to 5GMSu Aware Application 302 to make use of 5GMSu functions. Link 327 may relate to M7u, which may be a UE Media Streamer API exposed by Media Streamer 310 to 5GMSu Aware Application 302 and Media Session Handler 309 to make use of Media Streamer 310. Link 328 may relate to M8u, which may be an Application API which is used for information exchange between 5GMSu Aware Application 302 and 5GMSu Application Provider 301, for example to provide service access information to the 5GMSu Aware Application 302. The UE 303 may also be implemented in a self-contained manner such that interfaces M6u 326 and M7u 327 are not exposed.

Figure 4:
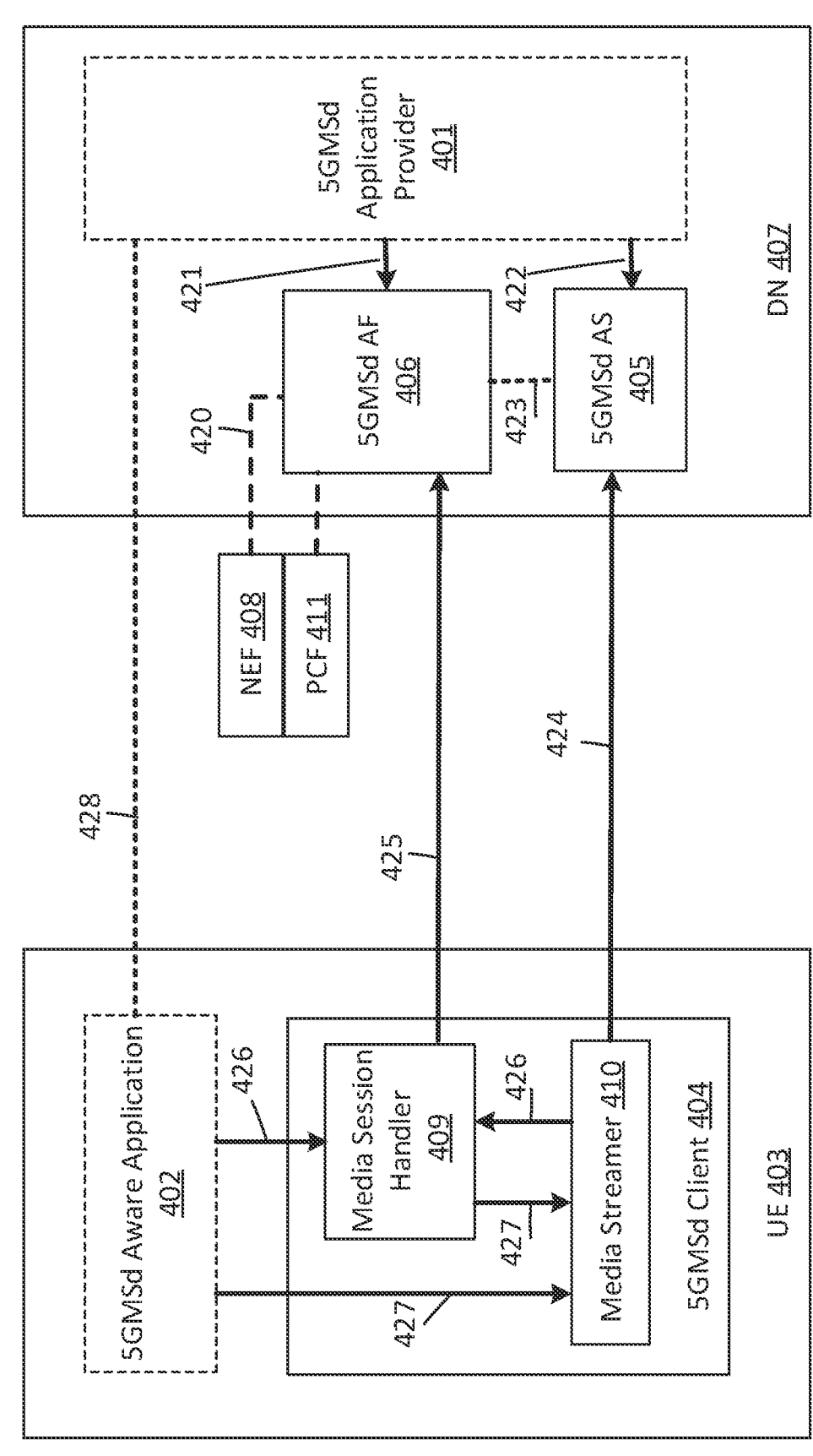
FIG. 4 is a diagram of a media architecture for media downlink streaming, according to embodiments.

FIG. 4 is a diagram of a media architecture 400 for media downlink streaming, according to embodiments. A 5GMSd Application Provider 401 may use 5GMSd for downlink streaming services. 5GMSd Application provider 401 may provide a 5GMSd Aware Application 402 on the UE 403 to make use of 5GMSd Client 404 and network functions using interfaces and APIs defined in 5GMSd. 5GMSd AS may be an AS dedicated to 5G Media Downlink Streaming. 5GMSd Client 404 may be a UE 403 internal function dedicated to 5G Media Downlink Streaming.

5GMSd AF 406 and 5GMSd AS 405 may be DN 407 functions. Functions in trusted DNs may be trusted by the operator's network. Therefore, AFs in trusted DNs may directly communicate with all 5G Core functions. Functions in external DNs may only communicate with 5G Core functions via the NEF 408 using link 420.

The media architecture 400 may connect UE 403 internal functions and related network functions for 5G Media Downlink Streaming. Accordingly, media architecture 400 may include a number of functions. For example, 5GMSd Client 404 on UE 403 may be a receiver of 5GMSd service that may be accessed through interfaces/APIs. 5GMSd Client 404 may include two sub-functions, media session handler 409 and media Player 410. Media session handler 409 may communicate with the 5GMSd AF 406 in order to establish, control and support the delivery of a media session. The Media Session Handler 409 may expose APIs that can be used by the 5GMSd Aware Application 402. Media Player 410 may communicate with 5GMSd AS 405 in order to stream the media content and provide a service to the 5GMSd Aware Application 402 for media playback, and the Media Session Handler 409 for media session control. 5GMSd Aware Application 402 may control 5GMSd Client 404 by implementing external application or content service provider specific logic and enabling the establishment of a media session. 5GMSd AS 405 may host 5G media functions. 5GMSd Application Provide 401 may be an external application or content specific media functionality, e.g., media creation, encoding, and formatting that uses 5GMSd to stream media to 5GMSd Aware Application 402. 5GMSd AF 406 may provide various control functions to the Media Session Handler 409 on the UE 403 and/or to 5GMSd Application Provider 401. 5GMSd AF 406 may relay or initiate a request for different PCF 411 treatment or interact with other network functions.

Media architecture 400 may include a number of different interfaces. For example, link 421 may relate to M1d, which may be a 5GMSd Provisioning API exposed by 5GMSd AF 406 to provision usage of media architecture 400 and to obtain feedback. Link 422 may relate to M2d, which may be a 5GMSd Ingest API exposed by 5GMSd AS 405 and used when 5GMSd AS 405 in trusted DN, such as DN 407, is selected to receive content for streaming service. Link 423 may relate to M3d, which may be an internal API used to exchange information for content hosting on 5GMSd AS 405 within a trusted DN such as DN 407. Link 424 may relate to M4d, which may be a Media Downlink Streaming API exposed by 5GMSd AS 423 to Media Player 410 to stream media content. Link 425 may relate to M5d, which may be a Media Session Handling API exposed by 5GMSd AF 405 to Media Session Handler for media session handling, control and assistance that also include appropriate security mechanisms e.g. authorization and authentication. Link 426 may relate to M6d, which may be a UE 403 Media Session Handling API exposed by Media Session Handler 409 to 5GMSd Aware Application 402 to make use of 5GMSd functions. Link 427 may relate to M7d, which may be a UE Media Player API exposed by Media Player 410 to 5GMSd Aware Application 402 and Media Session Handler 409 to make use of Media Player 410. Link 428 may relate to M8d, which may be an Application API which is used for information exchange between 5GMSd Aware Application 402 and 5GMSd Application Provider 401, for example to provide service access information to the 5GMSd Aware Application 402.

Figure 5A:
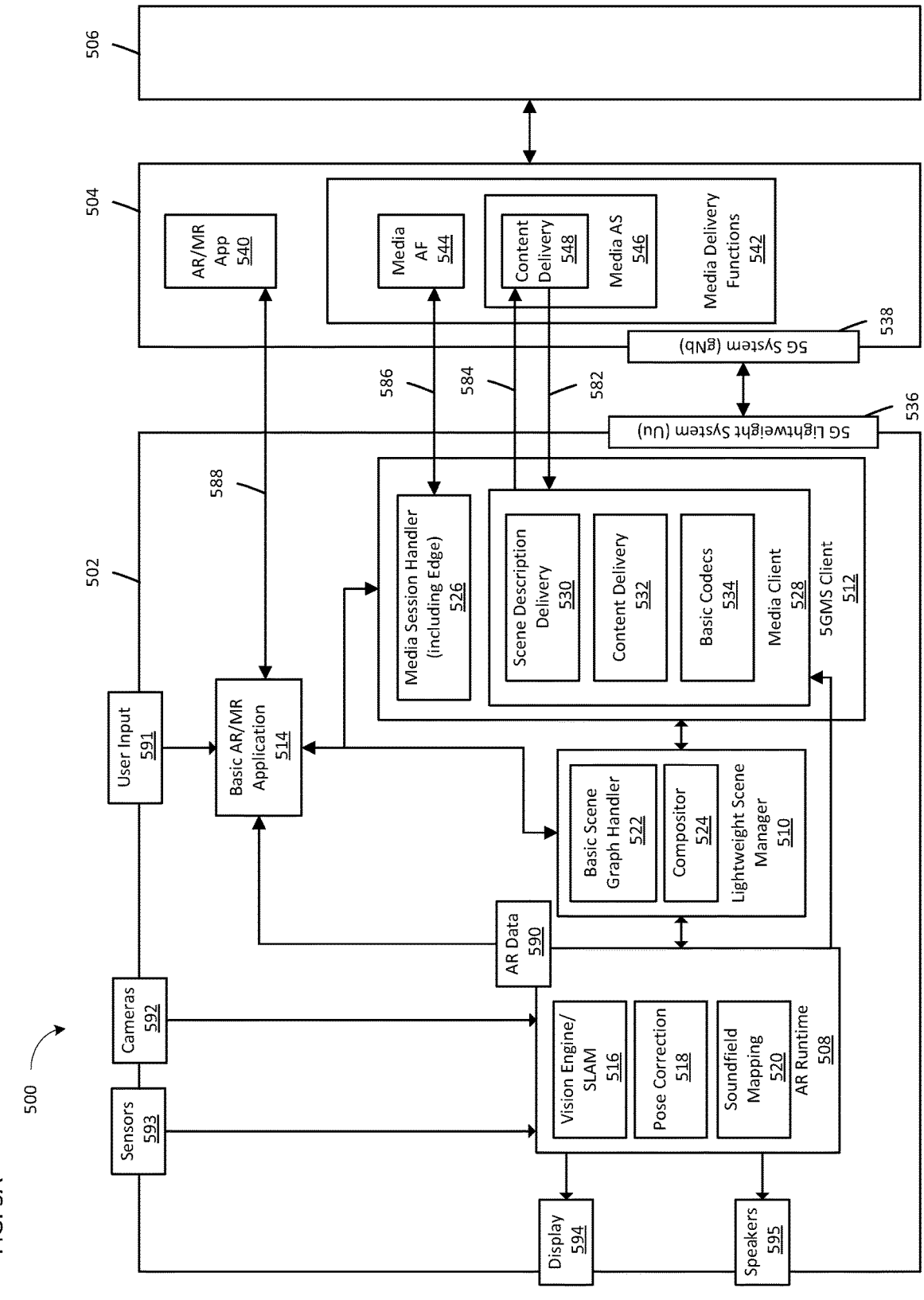
FIGS. 5A and 5B are diagrams of an edge dependent augmented reality (AR) (EDGAR) $5^{th}$ Generation media streaming downlink (5GMSd) download architecture, according to embodiments.
Figure 5B:
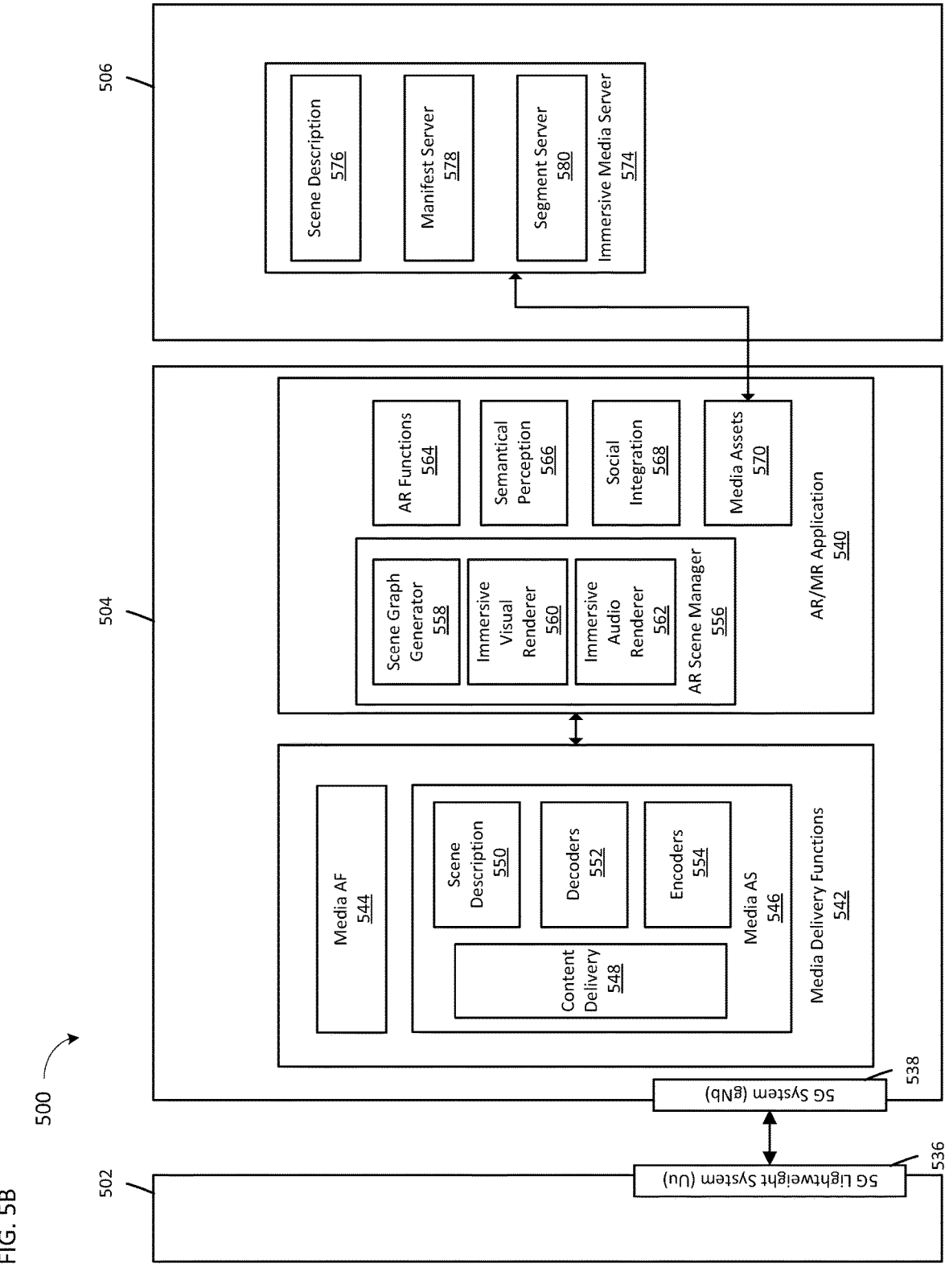
Figure 6A:
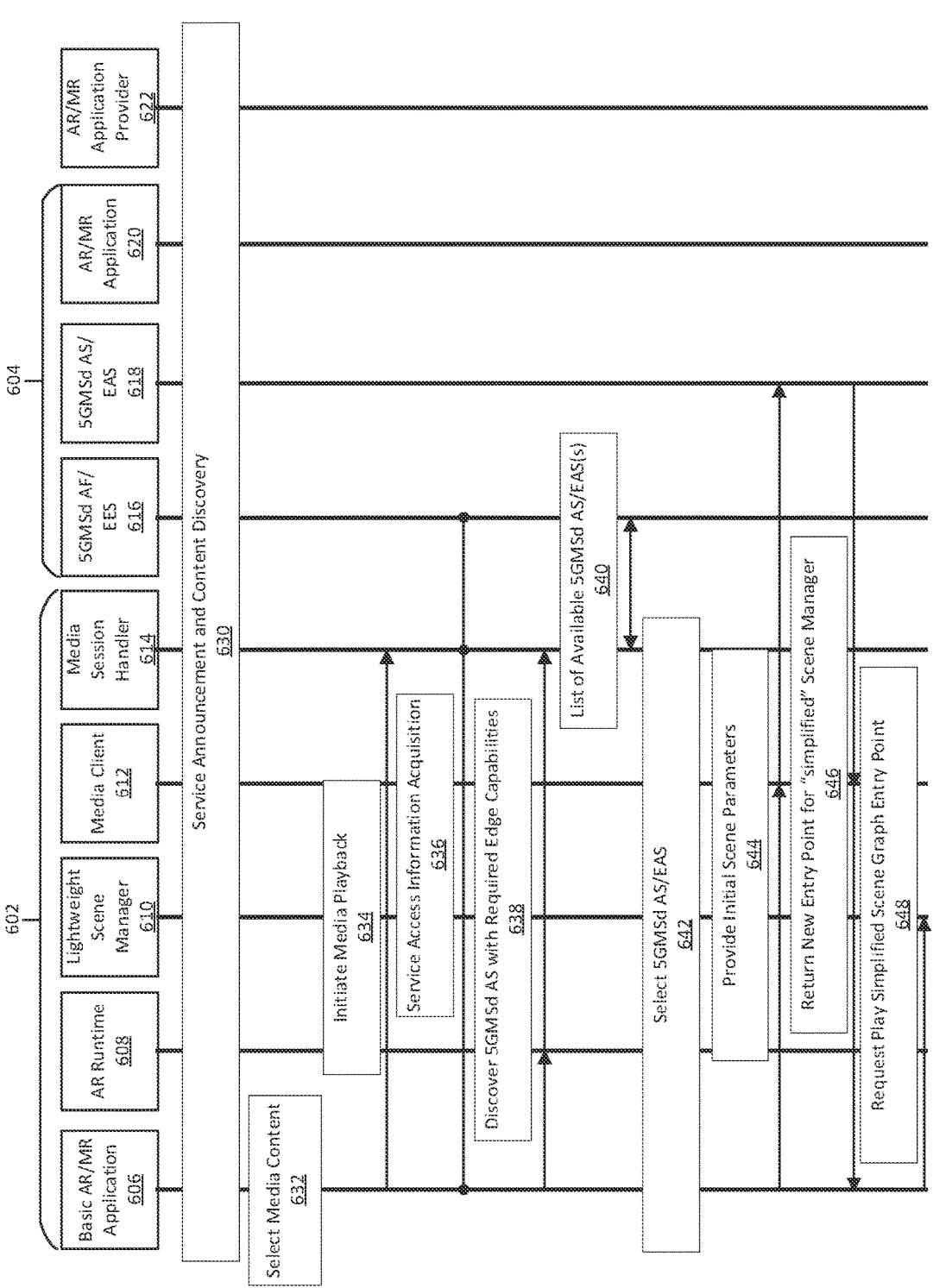
FIGS. 6A, 6B, 6C and 6D are diagrams of an operation flow for EDGAR-based 5G downlink streaming, according to embodiments.
Figure 6B:
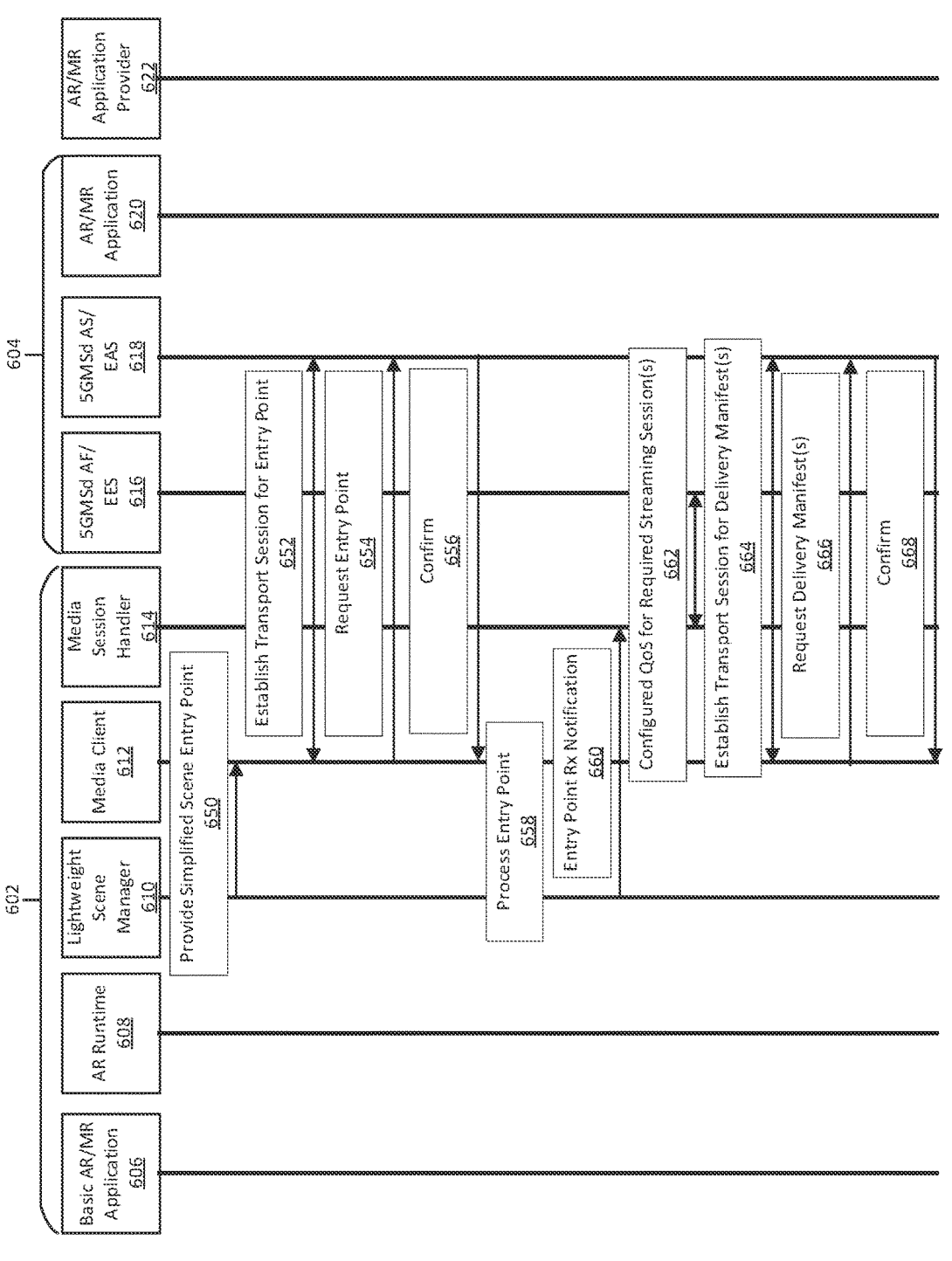
Figure 6C:
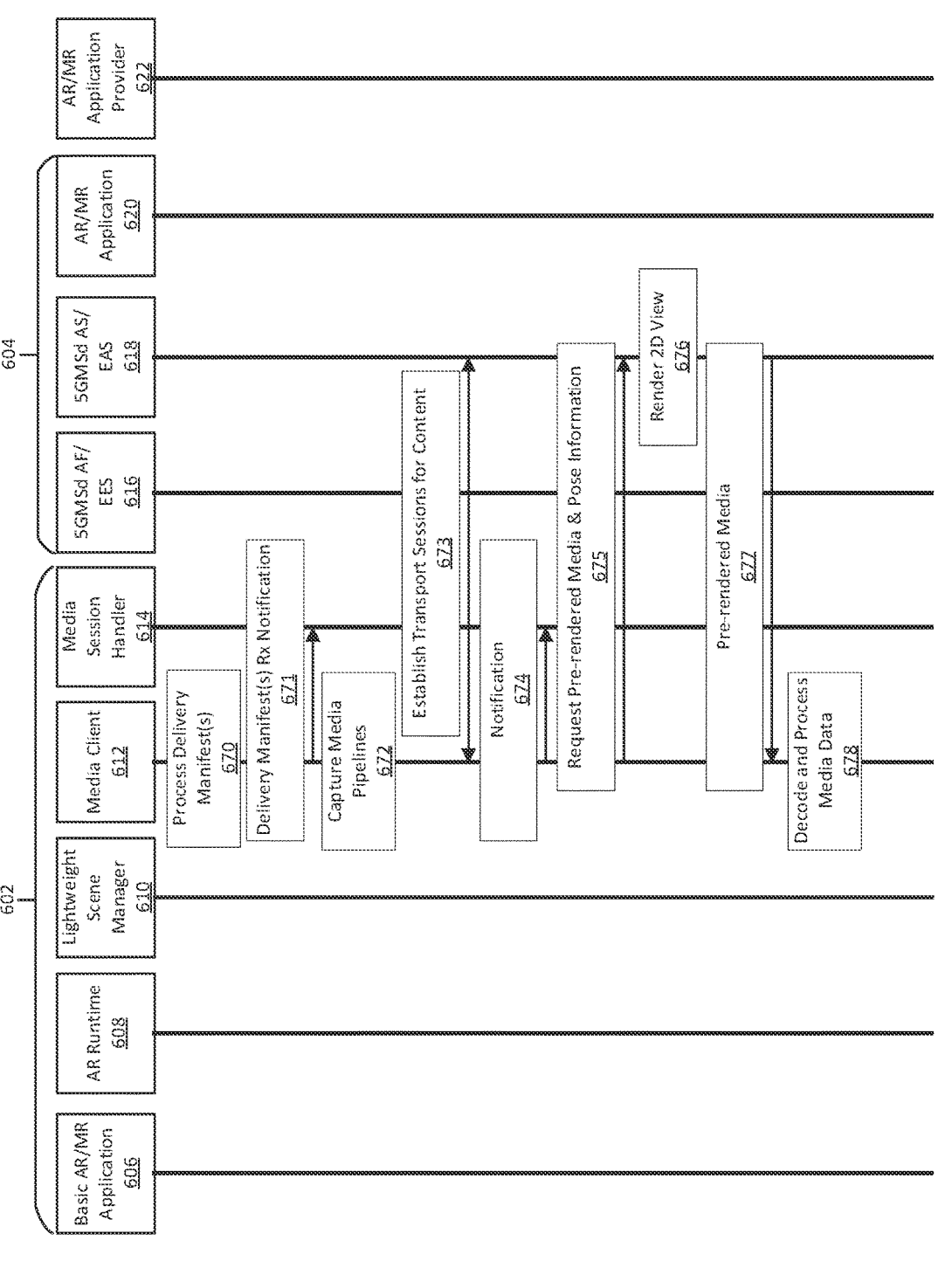
Figure 6D:
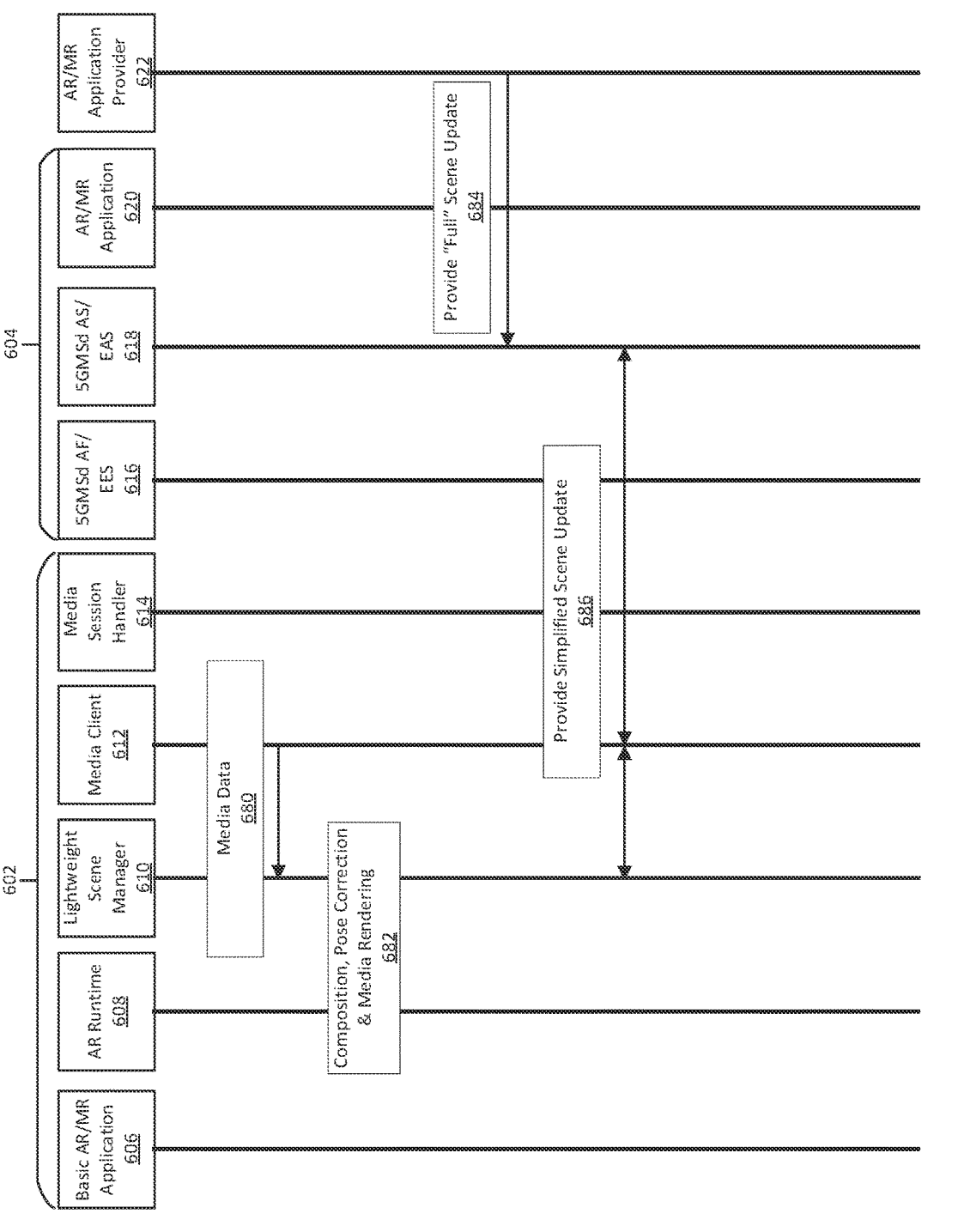

FIGS. 5A and 5B are diagrams of an edge dependent augmented reality (AR) (EDGAR) 5GMSd download architecture 500, according to embodiments. The AR EDGAR 5GMSd architecture 500 may be applied to mixed reality (MR) as well. The architecture 500 includes a 5G EDGAR UE 502, a cloud/edge server 504 and an AR/MR application provider 506. The 5G EDGAR UE 502 includes an AR runtime 508, a lightweight scene manager 510, a 5GMS client 512 and a basic AR/MR application 514. The AR runtime 508 includes a vision engine/simultaneous localization and mapping (SLAM) 516, a pose correction module 518, and a soundfield mapping module 520. The lightweight scene manager 510 includes a basic scene graph handler (SGH) 522 and a compositor 524. The 5GMS client 512 includes a media session handler (including an edge session) 526 and a media client 528. The media client 528 includes a scene description delivery module 530, a content delivery module 532 and basic codecs 534. The 5G EDGAR UE 502 includes a 5G lightweight system (Uu) 536 that is in communication with a 5G system (gNb) 538 of the cloud/edge server 504.

The cloud/edge server 504 includes an AR/MR application 540 and media delivery functions 542. The media delivery functions 542 include a media AF 544 and a media AS 546. The media AS 546 includes a content delivery function 548, a scene description function (SDF) 550, decoders 552 and encoders 554. The AR/MR application 540 includes an AR scene manager 556, AR functions 564, a semantical perception module 566, a social integration module 568, and a media assets database 570. The AR scene manager 556 includes a scene graph generator 558, an immersive visual renderer 560 and an immersive audio renderer 562.

The AR/MR application provider 506 includes an immersive media server 574. The immersive media server 574 includes a scene description module 576, a manifest server 578, and a segment server 580.

The media client 528 transmits to the content delivery functions 548 by an M4 interface 582 (e.g., transmitting pose and interactions). The content delivery functions 548 transmits to the media client 528 by an M4 interface 584 (e.g., transmitting pre-rendered media). The media session handler 526 is in communication with the media AF 544 by an M5d interface 586. The basic AR/MR application 514 is in communication with the AR/MR application 540 by an M8 interface 588. The basic AR/MR application 514 may receive a user input 591 and AR data 590 from the AR runtime 508. The AR runtime 508 may receive data from cameras 592 and sensors 593, and may output data to a display 594 and to speakers 595.

According to embodiments, the SCH 522 of the UE 502 may be capable of parsing a full scene graph (FSG) provided by the AR/MR application 540. The SCH 522 may provide a scene description with a list of media components and their description to the AR/MR application 540. The AR/MR application 540 selects a subset/list of media components from the FSG and provides the subset of media components to the SDF 550. The SDF 550 is configured to generate a simplified scene graph (SSG) from the FSG by combining one or more media components and reducing the number of notes in the FSG. The SDF 550 is also configured to arrange the media decoders 552 and the media encoders 554 and the content delivery function 548 on the edge to prepare the corresponding media components used in the SSG. The SSG may be delivered to the UE 502. The SCH 522 of the UE 502 is configured to parse and provide the SSG to the compositor 524 of the UE 502. The compositor 524 is configured to compose simple scene graphs, such as the SSG. The UE 502 is configured to stream the necessary media components from the content delivery function 548, and the UE 502 is configured to decode and compose the media components in the simplified scene.

Based on the FSG being updated during the media session, the system according to embodiments includes two capabilities. First, based on the SDF 550 being configured to convert the updated FSG to an updated SSG without losing any updates, the SDF 550 generates the updated SSG and delivers the updated SSG to the UE 502. Based on the FSG updated being beyond the current features of the SSG, the AR/MR application 540 may be informed about the FSG update. Then, the AR/MR application 540 is configured to select a new subset of media components from the FSG. Based on the new subset being the same as the previous selection, no scene update is needed. Based on the new subset including new media components or a modification of existing media components, the AR/MR application 540 informs the SDF 550 of the new subset. Based on the received new media subset, the SDF 550 is configured to generate a new SSG from the updated FSG and provide the new SSG to the UE 502. The SDF 550 is also configured to rearrange the media decoders 552, the media encoders 554 and the content delivery functions 548 on the cloud/edge server 504 to prepare the corresponding media components used in the updated SSG. The SCH 522 of the UE 502 is configured to parse the updated SSG, and is configured to stream the corresponding media component, compose the media component and play the composition.

FIGS. 6A, 6B, 6C and 6D are diagrams of an operation flow for EDGAR-based 5G downlink streaming, according to embodiments. The system performing the operation flow of FIG. 6 may include a basic AR/MR application 606, an AR runtime 608, a lightweight scene manager 610, a media client 612, and a media session handler 614, which may be part of the EDGAR UE 602 (furthermore, the media client 612 and the media session handler 614 may be part of the media access functions). The system also includes a 5GMSd AF/EES 616, a 5GMSd AS/edge application server (EAS) 618, and an AR/MR application 620, which may be part of the cloud/edge server 604. The system may also include an AR/MR application provider 622.

In operation 630, the system provides a service announcement and content discovery. The service announcement may be triggered by the AR/MR application 606. The service access information may include a media player entry or a reference to the service access information and may be provided through the M8d interface. In operation 632, the system selects the desired media content. In operation 634, the system initiates media playback. The AR/MR application 606 may trigger the media session handler 614 to start the media playback, and the media player entry may be provided to the media client 612. In operation 636, the system performs service access information acquisition. When the AR/MR application 606 has received only a reference to the service access information, the media session handler 614 interacts with the 5GMSd AF 616 to acquire the whole service access information. In operation 638, the AR/MR application 606 discovers the 5GMSd AS's with desired edge capabilities. In operation 640, the system provides a list of available 5GMSd AS/EAS(s).

In operation 642, the AR/MR application 606 and the media session handler 614 select the most suitable 5GMSd AS. In operation 644, the AR/MR application 606, through the lightweight scene manager 610 and the media client 612, provides the initial scene parameters. In operation 646, the 5GMSd AS 618 provides a new entry point for the SSG. Alternatively, the AR/MR application provider 622 may select or instantiate the 5GMSd for running the AR/MR edge application 620, such that operations 642, 644 and 646 may be omitted. In operation 648, the AR/MR application 606 requests the scene manager 610 to play the SSG entry point.

In operation 650, the system provides the simplified scene entry point to the media client 612. In operation 652, the system establishes a transport session for the entry point. In operation 654, the system requests the entry point from the 5GMSd AS 618. In operation 656, the system confirms the request. In operation 658, the system processes the entry point 658. In operation 660, the system provides an entry point receive notification to the media session handler 614. In operation 662, the system configures the quality of service (QoS) for the required streaming sessions. In operation 664, the system establishes transport sessions for delivery manifest(s). In operation 666, the system requests delivery manifest(s) from the 5GMSd AS 618. In operation 668, the system confirms the delivery manifest(s) request.

In operation 670, the system processes the delivery manifest(s). In operation 671, the system provides the delivery manifest(s) receive notification to the media session handler 614. In operation 672, the system captures media pipelines. In operation 673, the system establishes transport sessions for content. In operation 674, the system provides a notification of the transport sessions to the media session handler 614. In operation 675, the system requests from the 5GMSd AS 618 pre-rendered media and pose information. In operation 676, the system renders a two-dimensional view. In operation 677, the system provides the pre-rendered media to the media client 612. In operation 678, the system decodes and processes the media data.

In operation 680, the media client 612 provides media data to the lightweight scene manager 610. In operation 682, the system performs composition, pose correction, and media rendering. In operation 684, the AR/MR application provider 622 provides a full scene update to the 5GMSd AS 618. In operation 686, the system provides a simplified scene update.

Figure 7A:
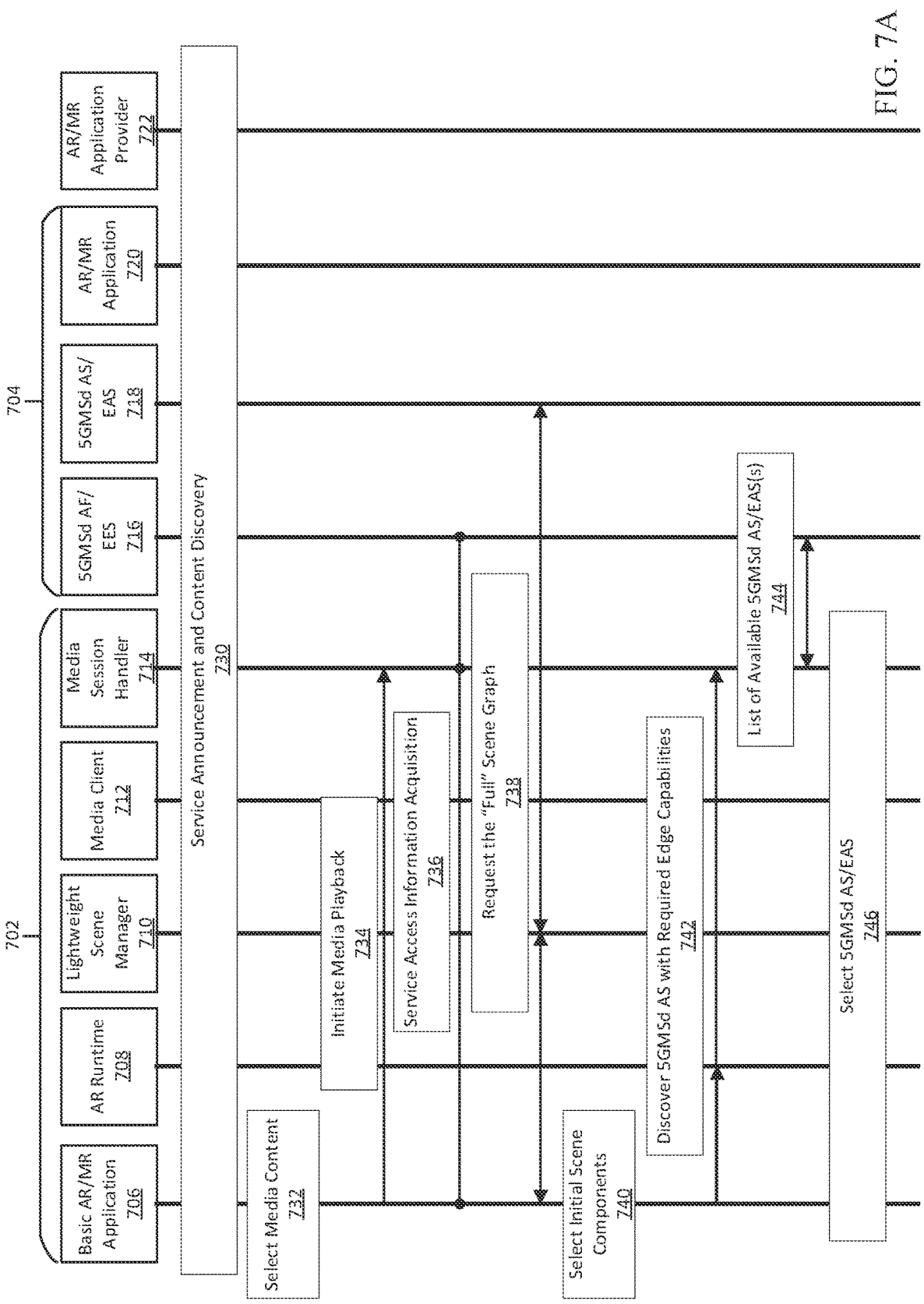
FIGS. 7A and 7B are diagrams of an operation flow for EDGAR-based 5G downlink streaming, according to embodiments.
Figure 7B:
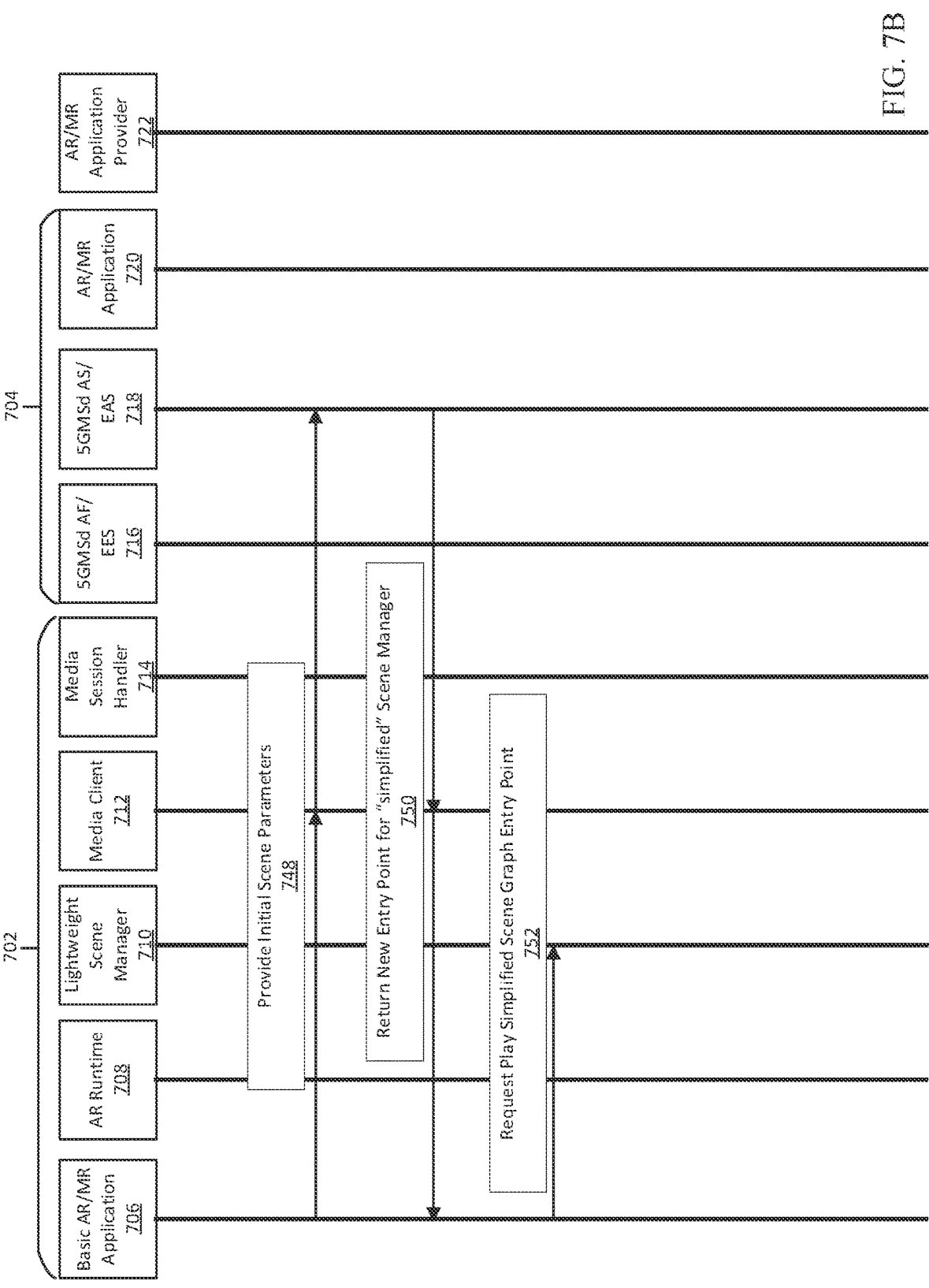

FIGS. 7A and 7B are diagrams of an operation flow for EDGAR-based 5G downlink streaming, according to embodiments. The system performing the operation flow of FIG. 7 may include a basic AR/MR application 706, an AR runtime 708, a lightweight scene manager 710, a media client 712, and a media session handler 714, which may be part of the EDGAR UE 702 (furthermore, the media client 712 and the media session handler 714 may be part of the media access functions). The system also includes a 5GMSd AF/EES 716, a 5GMSd AS/EAS 718, and an AR/MR application 720, which may be part of the cloud/edge server 704. The system may also include an AR/MR application provider 722.

In operation 730, the system provides a service announcement and content discovery. The service announcement may be triggered by the AR/MR application 706. The service access information may include a media player entry or a reference to the service access information and may be provided through the M8d interface. In operation 732, the system selects the desired media content. In operation 734, the system initiates media playback. The AR/MR application 706 may trigger the media session handler 714 to start the media playback, and the media player entry may be provided to the media client 712. In operation 736, the system performs service access information acquisition. When the AR/MR application 706 has received only a reference to the service access information, the media session handler 714 interacts with the 5GMSd AF 716 to acquire the whole service access information.

In operation 738, the system requests the FSG. Given the media entry point, the AR/MR application 706 may request the full scene description through the scene manager 710. In operation 740, the system selects initial scene components. That is, the AR/MR application 706 selects the initial scene components and derives the required edge capabilities. In operation 742, the AR/MR application 706 discovers the 5GMSd AS's with desired edge capabilities. In operation 742, the system provides a list of available 5GMSd AS/EAS (s). In operation 744, the system provides a list of available 5GMSd AS/EAS(s). In operation 746, the AR/MR application 706 and the media session handler 714 select the most suitable 5GMSd AS. In operation 748, the AR/MR application 706, through the lightweight scene manager 710 and the media client 712, provides the initial scene parameters. In operation 750, the 5GMSd AS 718 provides a new entry point for the SSG. In operation 752, the AR/MR application 706 requests the scene manager 710 to play the SSG entry point.

Figure 7C:
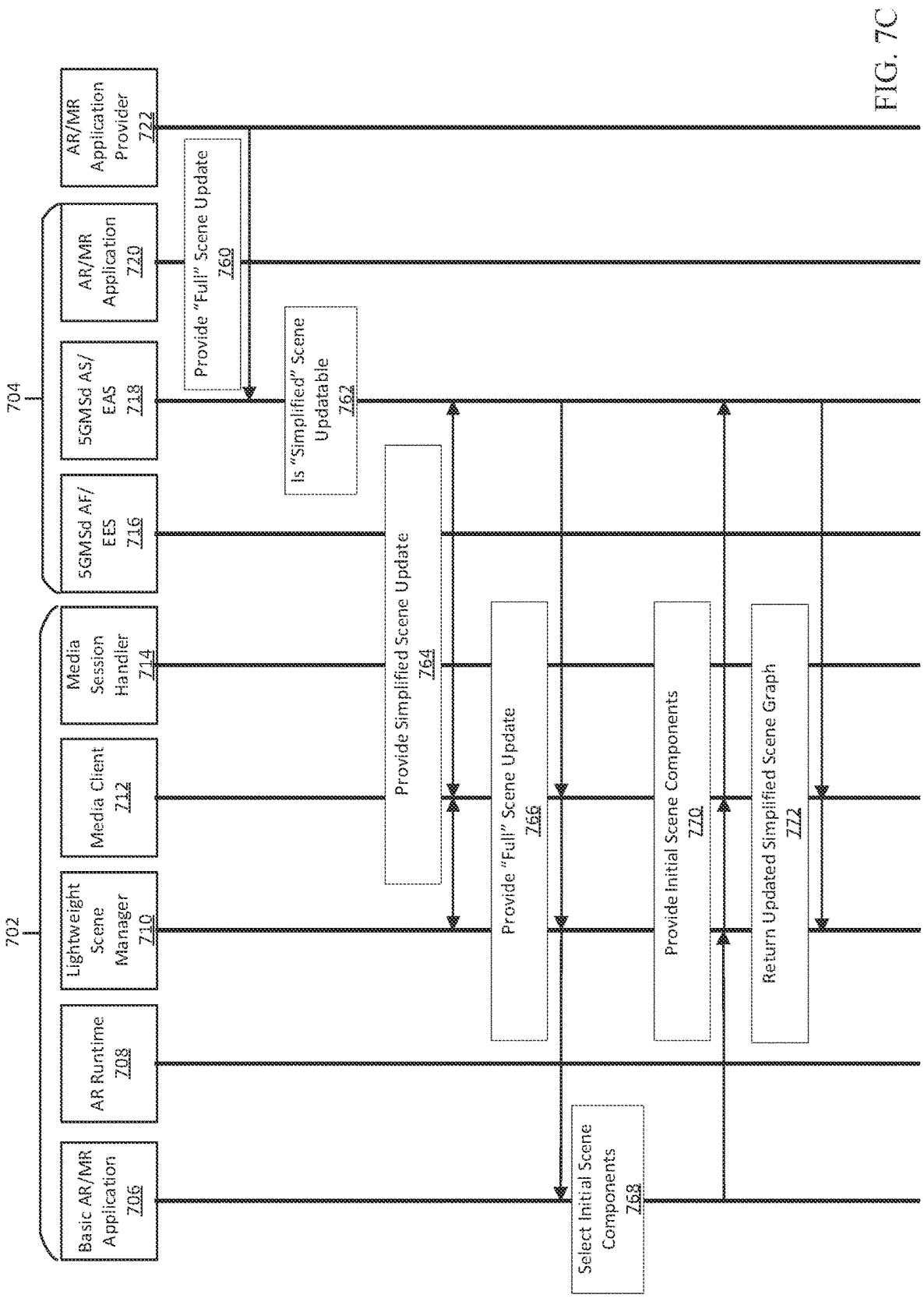
FIG. 7C is a diagram of an operation flow for an EDGAR-based procedure for scene updating, according to embodiments.

FIG. 7C is a diagram of an operation flow for an EDGAR-based procedure for scene updating, according to embodiments. In operation 760, the AR/MR application provider 722 proves a full scene update during the streaming. In operation 762, the 5GMSd AS 718 checks if a simplified scene update is possible. Based on the simplified scene update being possible, in operation 764, the 5GMSd AS 718 updates the simplified scene and provides the simplified scene to the scene manager 710 of the UE 702.

Based on the simplified scene update not being possible, the system performs operations 766-772. In operation 766, the 5GMDs AS 718 provides the full scene update to the AR/MR application 706. In operation 768, the AR/MR application 706 selects the initial scene components. In operation 770, the AR/MR application 706 provides the selected components to the 5GMSd AS 718. In operation 772, the 5GMSd AS 718 generates the updated simplified scene and provides the updated simplified scene to the scene manager 710 of the UE 702.

FIG. 8 is a flowchart of a process for EDGAR-based 5G downlink streaming, according to embodiments. In operation 802, the system selects, with an AR/MR application, media content for playback. In operation 804, the system discovers, with the AR/MR application, at least one 5GMSd AS with edge capabilities suitable for playback of the selected media content. In operation 806, the system selects, with the AR/MR application, the at least one 5GMSd AS for playback of the selected media content. In operation 808, the system requests, with the AR/MR application, playback of the selected media content by the selected at least one 5GMSd AS.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Thus, according to embodiments, the AR/MR application receives the FSGs and make a decision on which components of the scene graphs should be streamed (i.e., the AR/MR application is not just provided with a SSG). The edge resources are requested based on the processing needs of converting the FSG and its media components to the SSG and its media components. The updates on the FSGs may be handled depending on the extensiveness of the update. If the update can be implemented with an update to the SSG, the update occurs in the edge/cloud server. Otherwise, the FSG update is provided to the AR/MR application, and the AR/MR application may make a selection from the updated FSG. Thus, an updated SSG is generated according to the AR/MR application selection.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:

selecting, with an augmented reality (AR)/mixed reality (MR) application, media content for playback;

initiating, by the AR/MR application with a media session handler (MSH), playback of the media content;

discovering, with the AR/MR application, at least one 5th Generation media streaming downlink (5GMSd) application server (AS) with edge capabilities suitable for playback of the selected media content, wherein the MSH receives a list of available 5GMSd AS/edge application servers (EAS);

selecting, with the AR/MR application and the MSH, the at least one 5GMSd AS for playback of the selected media content;

providing, through a scene manager, initial scene parameters to the selected 5GMSd AS;

receiving, after providing the initial scene parameters from the selected 5GMSd AS, an entry point to a simplified scene;

requesting, by the AR/MR application, the scene manager to play the entry point to the simplified scene;

requesting, with the AR/MR application, playback of the selected media content by the selected at least one 5GMSd AS;

updating the simplified scene based on a full scene update and determining the simplified scene is updatable.

2. The method of claim 1, further comprising requesting, with the AR/MR application, a full scene graph of the selected media content.

3. The method of claim 2, further comprising selecting, with the AR/MR application, initial scene components based on the full scene graph.

4. The method of claim 1, further comprising receiving, with the selected at least one 5GMSd AS, the full scene update from an AR/MR application provider.

5. The method of claim 1, further comprising, based on determining that the simplified scene of the selected media content is updatable, providing, with the selected at least one 5GMSd AS, a simplified scene update based on the full scene update.

6. The method of claim 1, further comprising, based on determining that the simplified scene of the selected media content is not updatable:

provide, with the selected at least one 5GMSd AS, the full scene update to the AR/MR application;

selecting, with the AR/MR application, initial scene components;

providing, with the selected at least one 5GMSd AS, the selected initial scene components to the selected at least one 5GMSd AS; and returning, with the selected at least one 5GMSd AS, an updated simplified scene graph to a scene manager.

7. A device, comprising:

at least one memory configured to store program code; and at least one processor configured to read the program code and operate as instructed by the program code, the program code including:

initiating code configured to cause the at least one processor to initiate, by the AR/MR application with a media session handler (MSH), playback of the media content;

first selecting code configured to cause the at least one processor to select, with an augmented reality (AR)/mixed reality (MR) application, media content for playback;

first discovering code configured to cause the at least one processor to discover, with the AR/MR application, at least one 5th Generation media streaming downlink (5GMSd) application server (AS) with edge capabilities suitable for playback of the selected media content, wherein the MSH receives a list of available 5GMSd AS/edge application servers (EAS);

second selecting code configured to cause the at least one processor to select, with the AR/MR application and the MSH, the at least one 5GMSd AS for playback of the selected media content;

providing code configured to cause the at least one processor to provide, through a scene manager, initial scene parameters to the selected 5GMSd AS;

receiving code configured to cause the at least one processor to receive, after providing the initial scene parameters from the selected 5GMSd AS, an entry point to a simplified scene;

first requesting code configured to cause the at least one processor request, by the AR/MR application, the scene manager to play the entry point to the simplified scene;

second requesting code configured to cause the at least one processor to request, with the AR/MR application, playback of the selected media content by the selected at least one 5GMSd AS; and updating code configured to cause the at least one processor to update the simplified scene based on a full scene update and determining the simplified scene is updatable.

8. The device of claim 7, wherein the program code further comprises second requesting code configured to cause the at least one processor to request, with the AR/MR application, a full scene graph of the selected media content.

9. The device of claim 8, wherein the program code further comprises third selecting code configured to cause the at least one processor to select, with the AR/MR application, initial scene components based on the full scene graph.

10. The device of claim 7, wherein the program code further comprises first receiving code configured to cause the at least one processor to receive, with the selected at least one 5GMSd AS, the full scene update from an AR/MR application provider.

11. The device of claim 7, wherein the program code further comprises first providing code configured to cause the at least one processor to, based on determining that the simplified scene of the selected media content is updatable, provide, with the selected at least one 5GMSd AS, a simplified scene update based on the full scene update.

12. The device of claim 7, wherein, based on determining that the simplified scene of the selected media content is not updatable, the program code further comprises:

second providing code configured to cause the at least one processor to provide, with the selected at least one 5GMSd AS, the full scene update to the AR/MR application;

fourth selecting code configured to cause the at least one processor to select, with the AR/MR application, initial scene components;

third providing code configured to cause the at least one processor to provide, with the selected at least one 5GMSd AS, the selected initial scene components to the selected at least one 5GMSd AS; and first returning code configured to cause the at least one processor to return, with the selected at least one 5GMSd AS, an updated simplified scene graph to a scene manager.

13. A non-transitory computer-readable medium storing instructions, the instructions comprising: one or more instructions that, when executed by one or more processors of a device, cause the one or more processors to:

initiate, by the AR/MR application with a media session handler (MSH), playback of the media content;

select, with an augmented reality (AR)/mixed reality (MR) application, media content for playback;

discover, with the AR/MR application, at least one 5th Generation media streaming downlink (5GMSd) application server (AS) with edge capabilities suitable for playback of the selected media content, wherein the MSH receives a list of available 5GMSd AS/edge application servers (EAS);

select, with the AR/MR application and the MSH, the at least one 5GMSd AS for playback of the selected media content;

providing, through a scene manager, initial scene parameters to the selected 5GMSd AS;

receiving, after providing the initial scene parameters from the selected 5GMSd AS, an entry point to a simplified scene;

requesting, by the AR/MR application, the scene manager to play the entry point to the simplified scene;

request, with the AR/MR application, playback of the selected media content by the selected at least one 5GMSd AS; and update the simplified scene based on a full scene update and determining the simplified scene is update.

14. The non-transitory computer-readable medium of claim 13, wherein the instructions, when executed by the one or more processors, further cause the one or more processors to request, with the AR/MR application, a full scene graph of the selected media content.

15. The non-transitory computer-readable medium of claim 14, wherein the instructions, when executed by the one or more processors, further cause the one or more processors to select, with the AR/MR application, initial scene components based on the full scene graph.

16. The non-transitory computer-readable medium of claim 13, wherein the instructions, when executed by the one or more processors, further cause the one or more processors to receive, with the selected at least one 5GMSd AS, the full scene update from an AR/MR application provider.

17. The non-transitory computer-readable medium of claim 13, wherein the instructions, when executed by the one or more processors, further cause the one or more processors to, based on determining that the simplified scene of the selected media content is updatable, provide, with the selected at least one 5GMSd AS, a simplified scene update based on the full scene update.

* * * * *